United States Patent [19]
Bolger

[11] Patent Number: 4,623,915
[45] Date of Patent: Nov. 18, 1986

[54] APPARATUS FOR PROCESSING MULTIPLE TIME DIVISION MULTIPLEXED ASYNCHRONOUS COMPOSITE VIDEO SIGNALS

[75] Inventor: Thomas V. Bolger, Merchantville, N.J.

[73] Assignee: RCA Corporation, Princeton, N.J.

[21] Appl. No.: 653,074

[22] Filed: Sep. 21, 1984

[51] Int. Cl.[4] .............................................. H04N 5/45
[52] U.S. Cl. ...................... 358/22; 358/183
[58] Field of Search .................... 358/22, 31, 181, 183

[56] References Cited

U.S. PATENT DOCUMENTS

| | | | |
|---|---|---|---|
| 4,054,904 | 10/1977 | Saitoh et al. | 358/22 |
| 4,063,280 | 12/1977 | Hattori et al. | 358/22 |
| 4,139,860 | 2/1979 | Micic et al. | 358/22 |
| 4,249,213 | 2/1981 | Imaide et al. | 358/183 |
| 4,267,560 | 5/1981 | Ishikawa et al. | 358/22 |
| 4,278,993 | 7/1981 | Suzuki | 358/22 |
| 4,282,546 | 8/1981 | Reitmeier | 358/22 |
| 4,291,332 | 9/1981 | Kato et al. | 358/19 |
| 4,298,891 | 11/1981 | Baba et al. | 358/183 |
| 4,367,484 | 1/1983 | Kuroyanagi et al. | 358/22 |
| 4,385,315 | 5/1983 | George et al. | 358/191.1 |

FOREIGN PATENT DOCUMENTS

| | | | |
|---|---|---|---|
| 2540965 | 3/1977 | Fed. Rep. of Germany | 358/183 |
| 2542502 | 4/1977 | Fed. Rep. of Germany | 358/183 |
| 2756117 | 6/1979 | Fed. Rep. of Germany | 358/183 |

Primary Examiner—John W. Shepperd
Attorney, Agent, or Firm—E. M. Whitacre; P. J. Rasmussen; K. N. Nigon

[57] ABSTRACT

A digital TV receiver is disclosed which displays the image for an auxiliary channel as an inset in the image for a main channel. The asynchronous composite video signals of the main and auxiliary channels are time division multiplexed, one line of auxiliary signal for every three lines of main signal. The chrominance and luminance components of the main channel signal are separated by an adaptive comb filter. A low-pass filter removes the luminance vertical detail components from the combed main channel chrominance and also separates the luminance components from the chrominance components for the auxiliary signal. These asynchronous time division mutliplexed chrominance signals are processed by circuitry which corrects the chrominance phase of each of the signals to be relative to a single reference phase and then separates the two quadrature modulated color difference signals. The auxiliary channel luminance and color difference signals are subsampled and stored in a memory for display as an inset. The main channel samples are stored in a one-line memory as they are written. Stored lines are displayed a second time, when auxiliary channel signals are being processed, to provide a continuous main channel image.

15 Claims, 14 Drawing Figures

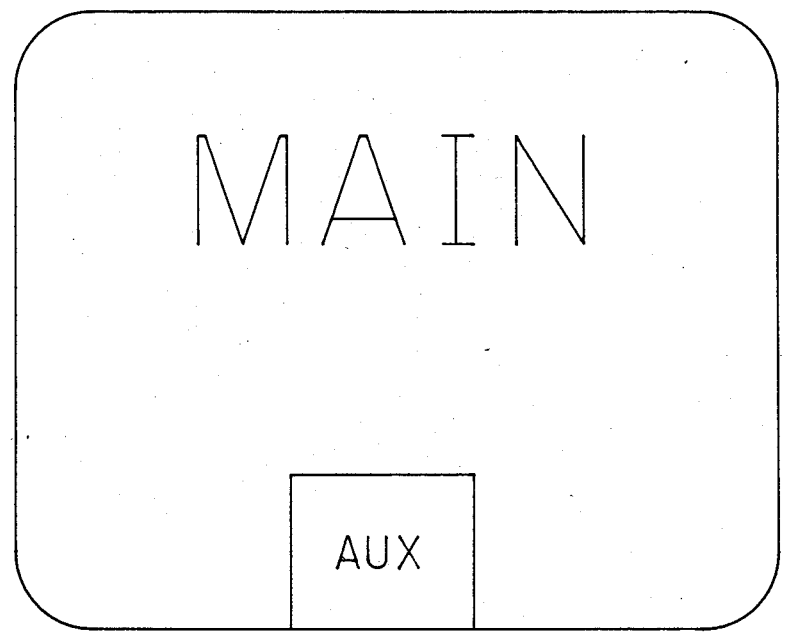
Fig. 1
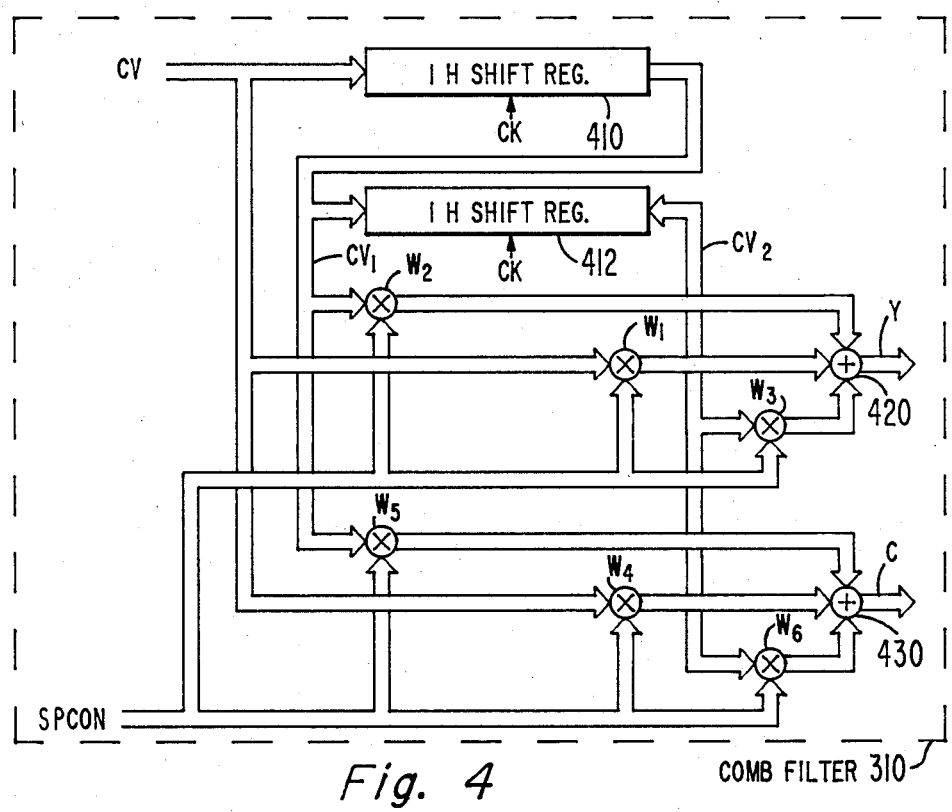
Fig. 4   COMB FILTER 310

| LINES USED BY COMB FILTER (CV,CV$_1$,CV$_2$) | L3,L2,L1 | AUX,L3,L2 | L5,L3,L2 | L6,L5,L3 | L7,L6,L5 | AUX,L7,L6 |
|---|---|---|---|---|---|---|
| LUMINANCE COMB WEIGHTS (W$_1$,W$_2$,W$_3$) | 1/4,1/2,1/4 | N/A,N/A,N/A | 1/4,1/4,1/2 | 1/2,1/4,1/4 | 1/4,1/2,1/4 | N/A,N/A,N/A |
| CHROMINANCE COMB WEIGHTS (W$_4$,W$_5$,W$_6$) | -1/4,1/2,-1/4 | N/A,N/A,N/A | -1/4,-1/4,1/2 | 1/2,-1/4,-1/4 | -1/4,1/2,-1/4 | N/A,N/A,N/A |

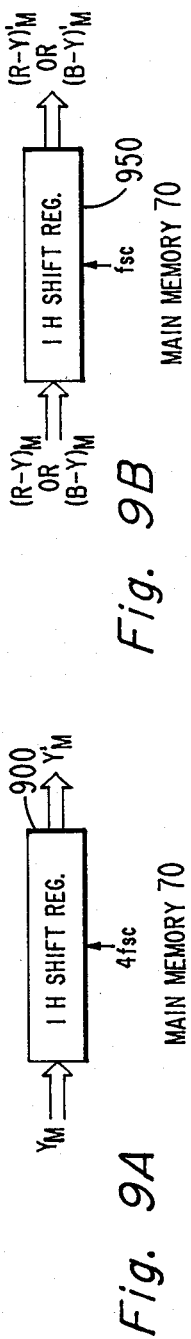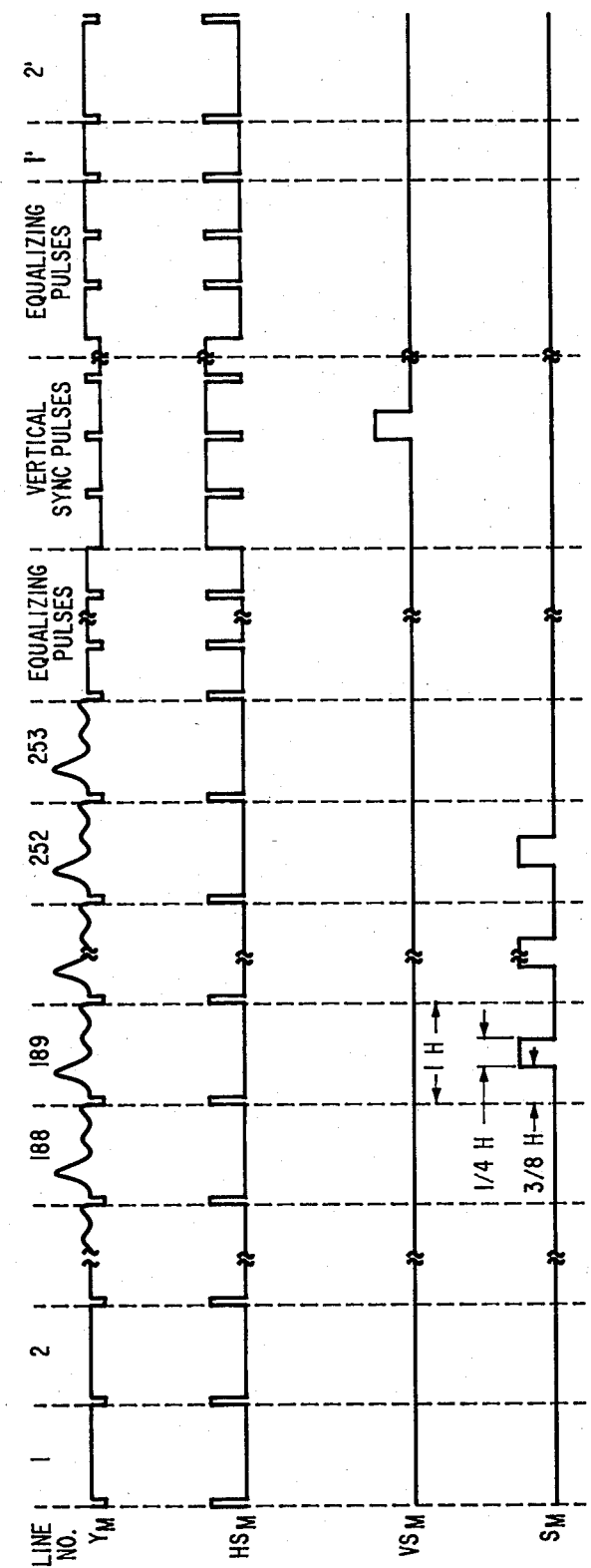

APPARATUS FOR PROCESSING MULTIPLE TIME DIVISION MULTIPLEXED ASYNCHRONOUS COMPOSITE VIDEO SIGNALS

The present invention relates generally to apparatus for processing multiple asynchronous composite video signals and particularly to such apparatus as would be useful in a picture within a picture (pix-in-pix) television receiver.

A pix-in-pix television receiver displays a main image derived from one signal and an auxiliary image derived from a second signal. The auxiliary image is usually displayed as an inset in a portion of the main image as shown in FIG. 1.

Although receivers of this type are available, they usually cost much more than conventional single-picture receivers. This extra cost is incurred due to the extra circuitry used by these receivers to reproduce a single image from two asynchronous signals.

The signals for the main and auxiliary images are typically out of phase because they are broadcast from different sources. They are difficult to combine because each signal contains several synchronizing signal components which are used by the receiver to reproduce an image. For example, the vertical sync pulses determine when each field of the picture starts and the horizontal sync pulses determine when each line starts. Since the main and auxiliary channels are broadcast from different sources, their horizontal and vertical sync pulses may occur at different times. One method of compensating for this lack of synchronism is to delay one signal with respect to the other by a sufficient time to synchronize these pulses. Although this method can be used to obtain a single synchronized image it is undesirable because it usually requires a large memory. Some prior art pix-in-pix receivers use as much as one frame of memory to provide this delay.

More difficult synchronizing problems must be solved if both the main and auxiliary images are to be displayed in color. The component of a composite video signal that controls the hue of colors in its reproduced image is the phase-modulated suppressed chrominance subcarrier. In a conventional single picture receiver the frequency of a phase locked loop oscillator is locked by the color burst signal, a component of the chrominance signal modulated with a reference phase. The signal provided by this oscillator is used by two synchronous detectors to recover quadrature modulated color difference signal components of the composite video signal. This color signal recovery circuitry is extremely sensitive to both the frequency and phase of the color synchronizing burst signal. Consequently, if the color signal components of two composite video signals are to be processed by one set of circuitry, conventional design techniques would require an extremely accurate variable delay element to synchronize the two signals. Alternatively, separate circuits can be used to process the main and auxiliary color signal components. Both of these methods add to the cost of the receiver.

Many prior art pix-in-pix receivers display a monochrome auxiliary picture to avoid the extra cost of color signal synchronization or separate color signal processing. This method, however, is undesirable since the color information in the auxiliary picture is lost.

The added cost of the apparatus used to process two composite video signals is one factor that makes pix-in-pix receivers more expensive than single picture receivers; another factor is the extra tuner that is used to provide the auxiliary picture signal. A pix-in-pix receiver that uses only one tuner to receive both the main and auxiliary signals can be considerably less expensive than a receiver that needs two tuners.

Accordingly, it is an object of this invention to provide a video signal processing system which can process a time-division multiplexed signal composed of multiple composite video signals to provide for simultaneous reproduction of the images carried by the signals in color. This system uses the same circuitry for processing the main and auxiliary pictures and uses much less than one frame of memory.

It is a further object of this invention to provide a video signal processing system that can be used in a pix-in-pix color television receiver having a single tuner.

SUMMARY OF THE INVENTION

Apparatus for processing multiple asynchronous composite video signals in accordance with the present invention is embodied in a system which includes a source of time multiplexed main and auxiliary composite video signals, providing one line of auxiliary signal for every integer N lines of main signal. The present invention includes a filtering system for separating the luminance and chrominance components from the time-division multiplexed composite video signals. The separated time-division multiplexed chrominance components are coupled to a demodulating system which recovers quadrature modulated color difference signal components. The main signal chrominance components are processed by the demodulating system in synchronism with the main signal burst component and the auxiliary signal chrominance components are processed in synchronism with the auxiliary signal burst component.

BRIEF DESCRIPTION OF THE DRAWINGS

FIG. 1 is a pictorial representation of the type of image that would be produced on a display device coupled to the present invention.

FIG. 4 is a block diagram of the comb filter used in the signal processor shown in FIG. 3.

FIGS. 9A and 9B are block diagrams of the main signal luminance and color difference signal memories respectively.

FIG. 10 is a signal timing diagram useful for explaining the operation of the multiplexer control circuit used in the receiver shown in FIG. 2.

DETAILED DESCRIPTION

Figure 2:
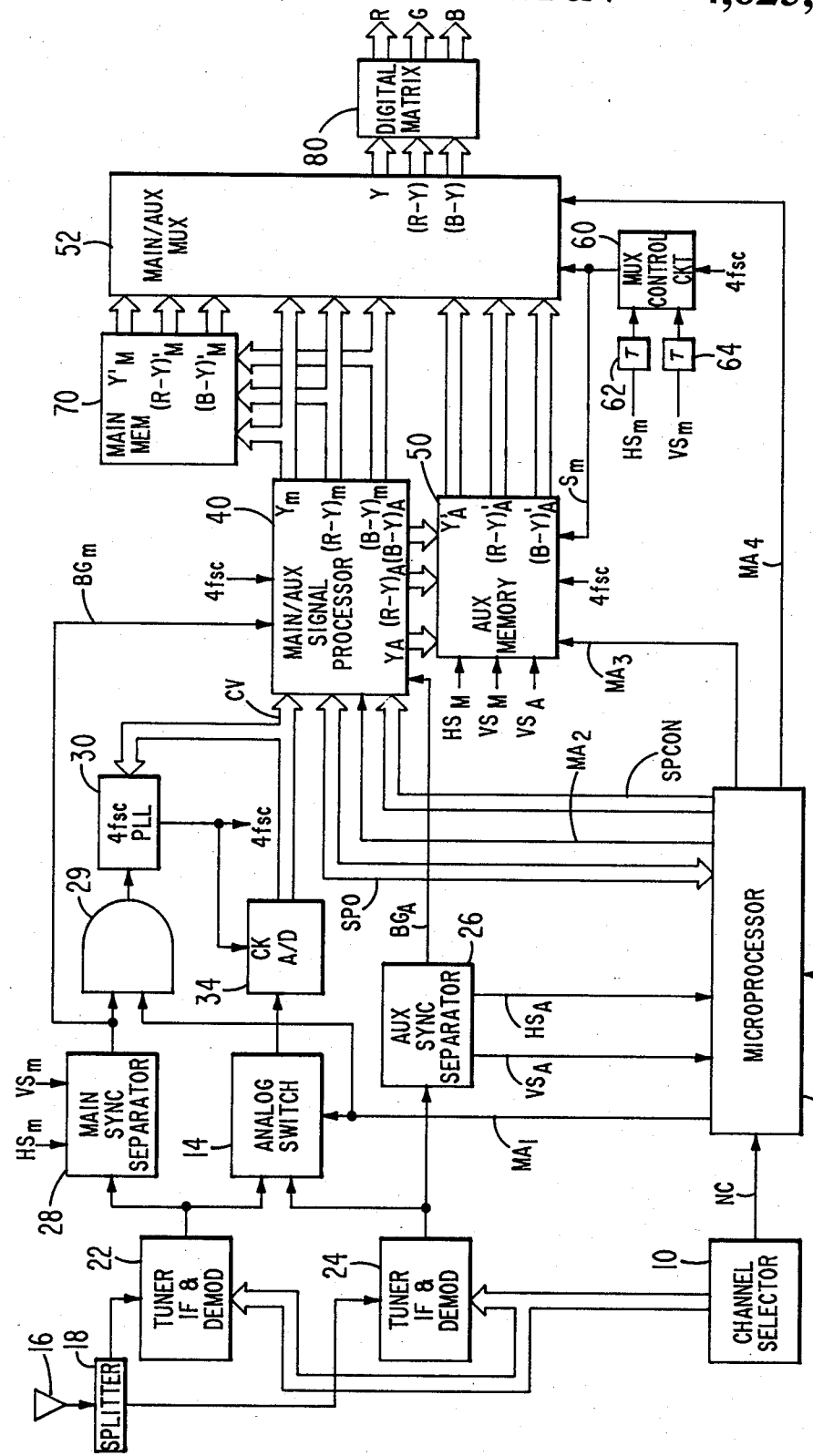
FIG. 2 is a block diagram of a pix-in-pix television receiver incorporating an embodiment of the present invention.

A pix-in-pix television receiver provides the soundless picture of an auxiliary program inset into the picture of the main program. In the embodiment described below, the auxiliary picture is composed of every fourth sample of every fourth line of one field from each frame of the auxiliary signal. This auxiliary picture is displayed twice during a frame time, once for each field of the main picture. In this embodiment, the inset picture occupies one-sixteenth of the main picture area and is positioned at the bottom of the main picture as shown in FIG. 1.

A particular advantage of this embodiment of the invention is its ability to work on time-division multiplexed main and auxiliary signals. Two separate tuner circuits may be used to develop the main and auxiliary signals. These signals are applied to a two-input analog switch which is controlled by signals developed from the auxiliary signal to time-division multiplex the two signals. This switch provides auxiliary signals for every fourth line of every other field of the auxiliary image. These signals are provided from a time just prior to the leading edge of the horizontal sync pulse for a given line to a time just subsequent to the end of active video on that line. This embodiment of the invention uses a microprocessor to control the analog switch as well as to control other switches in the system which direct the auxiliary and main signals along their respective paths. All of these switches are desirably closely synchronized to each other and to the auxiliary signal to minimize contamination of the signals by switching artifacts. In the present embodiment, the microprocessor synchronizes itself by monitoring the auxiliary signal for at least one frame time prior to generating a display and by periodically monitoring the timing of the horizontal sync pulses as the main and auxiliary images are displayed.

The auxiliary signal is processed through a subset of the luminance and chrominance signal processing circuitry used to process the main signal. This subset provides auxiliary luminance and color difference signals which may have a narrower bandwidth than the main channel signals but which are acceptable for the reduced-size auxiliary image.

Subsequent to this processing, auxiliary channel luminance and chrominance signals are stored in a memory for later display. The luminance signals, which had been sampled at a rate equal to four times the color burst frequency (4 $f_{sc}$), are stored at one-quarter of this rate ($f_{sc}$). Similarly, the chrominance signals which had been sampled at an $f_{sc}$ rate are stored at a $\frac{1}{4}$ $f_{sc}$ rate.

Since the main channel signal is time-division multiplexed with the auxiliary channel signal, the processing of the signals is also time-division multiplexed. The signal processing circuitry provides main channel luminance and color difference signals during three horizontal line periods and auxiliary channel signals during one horizontal line period. However, since the auxiliary picture is displayed as an inset in the main picture, main channel information must be displayed on at least a portion of every horizontal line. Accordingly, in the present embodiment, as each line of the main signal is procesed, it is stored in a 1H memory. When an auxiliary line is processed, the contents of this 1H memory are read for display (i.e. the preceeding line is displayed again).

The exemplary embodiment that is generally described above is described in more detail below. This embodiment of the invention is in the context of a digital television receiver. It is noted, however, that the invention may also be practiced in analog form.

In the drawings, broad arrows represent busses for parallel multiple-bit digital signals. Line arrows represent connections carrying analog signals or single-bit digital signals. A device having a small circle at its input terminal responds to the logical complement of the signal applied to that terminal. Depending on the processing speed of the devices, compensating delays may be required in certain of the signal paths, but one skilled in the art of circuit design would known where such delays would be needed in his particular system.

In FIG. 2 the main and auxiliary signals are received via antenna 16 and applied to signal splitter 18. Splitter 18 provides input signals to tuner IF amplifier and demodulator circuits 22 and 24. The signal selected by the tuner of either one of the circuits 22 or 24 is converted to an intermediate frequency signal by the tuner portion of the circuit and amplified by the IF amplifier portion. This amplified IF signal is applied to the detector portion of the circuit which provides baseband composite video signals at the output terminal of the circuit.

The signal selected by the tuner of circuit 22 is the main signal and the signal selected by the tuner of circuit 24 is the auxiliary signal. Splitter 18 prevents these signals from interfering with each other. In the present embodiment circuits 22 and 24 each include a digitally controllable tuner such as, for example, the one disclosed in U.S. Pat. No. 4,385,315 entitled "Phase Locked Loop Tuning Control system Including A Timed Sync Activated AFT Signal Seeking Arrangement" issued in the names of George et al.

Signal frequencies (i.e. channels) are selected for the tuners by channel selector 10. Channel selector 10 includes, for example, a calculator-like keyboard for generating, from operator input, two sets of binary coded decimal (BCD) signals, one for each of the tuners 22 and 24. These BCD signals are applied to the tuners via a bus from selector 10. Channel selector 10 also provides a signal, NC, to microprocessor 12 that indicates when a new auxiliary channel has been selected. This signal starts an initialization sequence in the microprocessor which determines the timing of the auxiliary channel horizontal and vertical sync signals.

Circuit 22 provides main channel composite video signals to one signal input terminal of analog switch 14. Auxiliary channel signals are applied to the other signal input terminal of switch 14 by circuit 24. Analog switch 14 is controlled by a single bit digital input signal, $MA_1$, from microprocessor 12. This signal is set to a logic high state to condition the switch 14 to pass main channel signals and to a logic low state to condition the switch to pass auxiliary channel signals. Microprocessor 12, based on the timing information it has collected, changes this signal to a logic low state at a time immediately prior to the leading edge of the horizontal sync pulse of the auxiliary signal for every fourth line in every other field of the auxiliary image. At the end of the active video portion of each of these auxiliary lines, the microprocessor conditions the analog switch 14 to pass the main channel signal by placing $MA_1$ into a logic high state. Consequently, switch 14 passes the auxiliary signal for one out of every four lines in one field, passing three out of every four lines of the main signal for that field and every line of the main signal for the next subsequent field.

In order to synchronize the analog switch 14 to the auxiliary input signal, microprocessor 12 monitors the vertical and horizontal sync pulses of the auxiliary signal. These sync pulses are supplied to the microprocessor by auxiliary sync separator 26. Auxiliary channel composite video signals are applied to the input terminal of sync separator 26 by tuner IF and demodulator circuit 24. Sync separator 26 may be a conventional analog circuit which provides three signals $VS_A$, $HS_A$ and $BG_A$; the vertical sync, horizontal sync and burst gate signals respectively for the auxiliary channel signals. The vertical and horizontal sync signals are applied to microprocessor 12.

The main channel composite video signals from circuit 22 are applied to the main sync separation circuit 28. This circuit may be identical to sync separator 26. Sync separator 28 provides three output signals, $HS_M$, $VS_M$ and $BG_M$, the main channel horizontal sync, vertical sync and burst gate signals respectively. These signals are used at various stages of signal processing as described below.

The time-division multiplexed main and auxiliary channel composite video signals from analog switch 14 are applied to analog to digital (A/D) converter 34. A/D converter 34, which may be, for example, an 8 bit flash-type converter, provides digital samples at a $4f_{sc}$ rate. The clock signal for the A/D converter is developed by phase locked loop (PLL) 30. PLL 30 may be a known circuit, for example, the loop disclosed in U.S. Pat. No. 4,291,332 entitled "Phase-Locked Circuit" and issued in the names of Kato et al. Digital samples of composite video signals from A/D converter 34 are applied to one input of PLL 30. The phase locked loop 30 uses the burst component of these signals to lock a voltage controlled oscillator to a frequency four times the burst frequency ($4f_{sc}$). The burst component is separated from the composite video signals in a conventional manner by the burst gate signal applied to PLL 30 via AND gate 29. This burst gate signal is available to the PLL only during the burst interval of the main channel signal. AND gate 29 which has the main channel burst gate signal $BG_M$, and the main/auxiliary control signal, $MA_1$, applied to its input terminals, provides the main channel burst gate pulse only when main channel burst component is being passed through A/D converter 34. AND gate 29 prevents PLL 30 from attempting to lock to the auxiliary channel burst.

It is noted that a phase locked clock signal is not a necessary part of this invention. It is contemplated that a suitably accurate free-running oscillator operating at $4f_{sc}$ can also be used with the disclosed apparatus.

The $4f_{sc}$ clock signal from PLL 30, the main and auxiliary burst gate signals from sync separators 28 and 26 respectively, and the composite video samples from A/D converter 34 are applied to the main/auxiliary signal processor 40. Processor 40 is controlled by microprocessor 12 via control bus SPCON. A data bus, SPD, connects processor 40 and microprocessor 12, to provide a data exchange channel between the two devices. Processor 40 converts the time-division multiplexed composite video samples into main channel luminance and R-Y and B-Y color difference signals available at output ports $Y_M$, $(R-Y)_M$ and $(B-Y)_M$ respectively, and into auxiliary channel luminance and color difference signals available at output ports $Y_A$, $(R-Y)_A$ and $(B-Y)_A$ respectively.

Figures 3, 5:
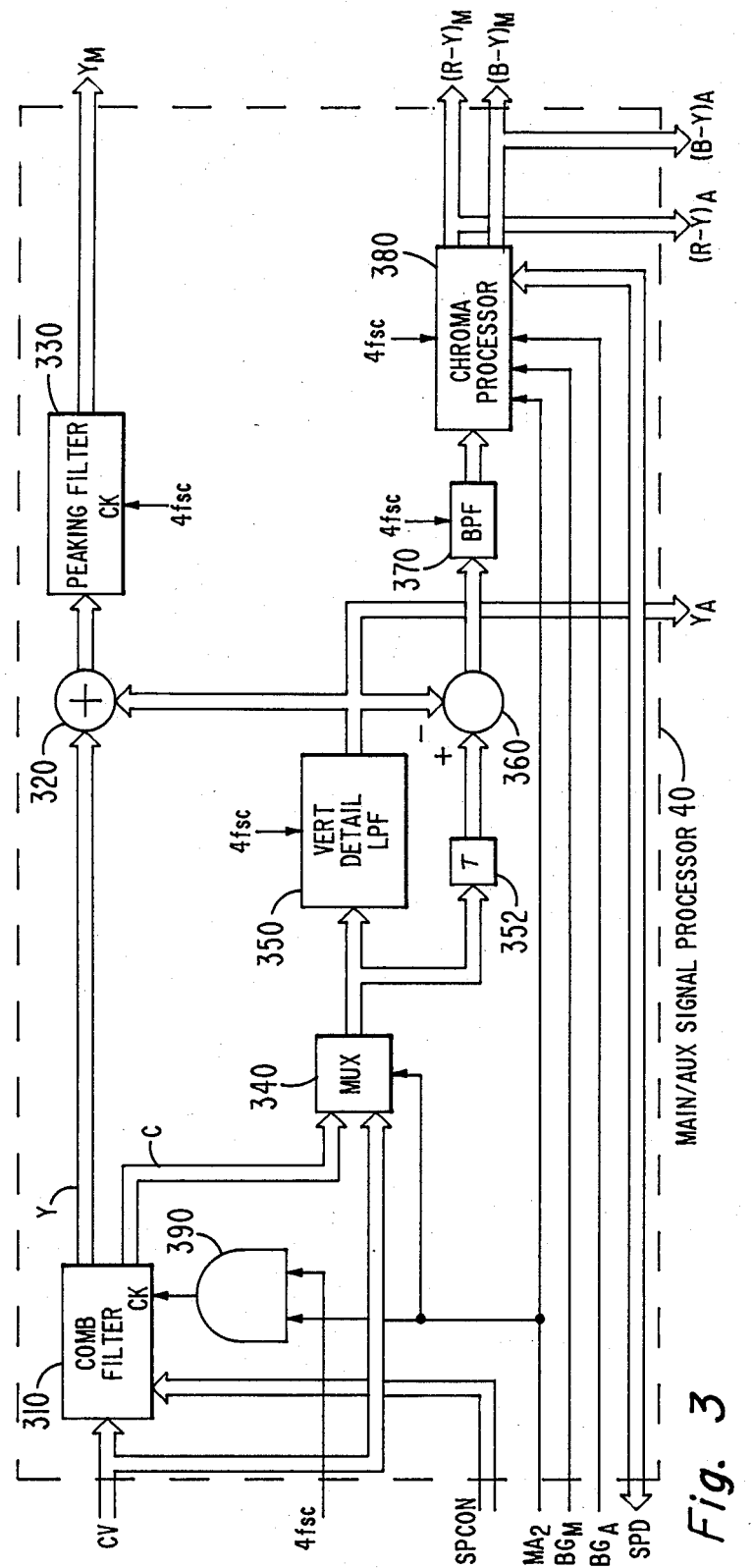
FIG. 3 is a block diagram of the main/auxiliary signal processor used in the receiver shown in FIG. 2.
FIG. 5 is a table of values useful for explaining the operation of the comb filter shown in FIG. 4.

FIG. 3 is a block diagram representation of the main-/auxiliary signal processor 40 used in FIG. 2. To simplify explanation, the main channel signal processing steps of this processor are described first.

Samples from A/D converter 34 representing the time division multiplexed, mutually independent main and auxiliary signals are applied to comb filter 310 via bus CV. Comb filter 310 is controlled by the output signal of AND gate 390 to act only on main channel samples. The inputs to gate 390 are a single bit digital control signal, $MA_2$, from microprocessor 12 and the $4f_{sc}$ system clock signal from PLL 30. Signal $MA_2$ is a delayed replica of the main/auxiliary control signal $MA_1$. $MA_2$ is in a logic high state when main channel samples are available on bus CV and in a logic low state otherwise. Consequently, AND gate 390 provides a clock signal to comb filter 310 only when main channel samples are to be processed. Microprocessor 12 also provides control signals directly to comb filter 310 via bus SPCON.

Comb filter 310 is shown in detail in FIG. 4. Composite video samples are applied to shift register 410 via bus CV. Shift register 410 delays these samples by one horizontal line period (1H) and applies them to the input of shift register 412 via bus $CV_1$. Shift register 412 further delays the samples by 1H, providing output samples via bus $CV_2$.

Samples from bus CV are applied to the multiplicand input terminals of sample weighting circuits $W_1$ and $W_4$. Similarly, samples from bus $CV_1$ are applied to the multiplicand input terminals of sample weighting circuits $W_2$ and $W_5$ and samples from bus $CV_2$ are applied to the multiplicand input terminals of sample weighting circuits $W_3$ and $W_6$. The multiplier inputs to sample weighting circuits $W_1$ through $W_3$ are weighting factors of ½ or ¼ which are applied to the individual weighting circuits via bus SPCON from microprocessor 12 of FIG. 2. Similarly, sample weighting circuits $W_4$ through $W_6$ have weighting factors of ½ or −¼ applied by microprocessor 12.

The scaled samples provided by the weighting circuits $W_1$, $W_2$ and $W_3$ are summed by adder 420 to generate a luminance signal Y. Samples from weighting circuits $W_4$, $W_5$ and $W_6$ are summed by adder 430 to provide a chrominance signal C.

The value of the weighting factor applied to each of the sample weighting circuits $W_1$ through $W_6$ changes as each new line of video signal is applied to input bus CV. FIG. 5 is a table which shows the sequence of change of these weighting factors. The top row of the table shows the lines of the main channel signal that are available on the busses CV, $CV_1$ and $CV_2$ as six consecutive horizontal lines are processed. As set forth above, these lines are not synchronized to the lines of the auxiliary signal. In the first column of the table, lines L1 and L2 have been stored in shift registers 412 and 410 respectively and line L3 is being received. Consequently, line L3 is available via bus CV, line L2 via bus $CV_1$ and line L1 via bus $CV_2$.

The last two rows of the table show the weighting factors that are applied to the corresponding lines, listed in the first row of the table, to obtain combed luminance, Y, and combed chrominance, C. The factors listed in the first column of the table are for the three consecutive lines of composite video signal L3, L2 and L1. In the NTSC system lines L1 and L3 have the same chrominance phase. The chrominance phase of line L2 is opposite to that of lines L1 and L3. The samples of lines L1 and L3 are respectively scaled in sample weighting circuits $W_1$ and $W_3$ by $\frac{1}{4}$, and the samples of line L2 are scaled by $\frac{1}{2}$ in weighting circuit $W_2$. Due to the respective chrominance phases of the signals, the chrominance components of these samples cancel when they are summed, leaving comb filtered luminance samples at the output of adder 420. The samples of lines L1 and L3 are respectively scaled by $-\frac{1}{4}$ in sample weighting circuits $W_4$ and $W_6$, and the samples of line L2 are scaled by $\frac{1}{2}$ in weighting circuit $W_5$. Summing these scaled samples substantially cancels the luminance component leaving comb filtered chrominance at the otuput of adder 430. Those skilled in the art will recognize that for three consecutive lines available on busses CV, $CV_1$ and $CV_2$, the apparatus of FIG. 4 is configured as a conventional 2H comb filter.

The second column of the table shows the state of the comb filter one line later. Lines L2 and L3 are now stored in shift registers 412 and 410 respectively and a line from the auxiliary channel is being received. Since the auxiliary signal is on bus CV, the main/auxiliary control signal $MA_2$ will be in a low logic state. Accordingly, the clock signal to the comb filter will be disabled by AND gate 390 shown in FIG. 3. Without a clock signal, no samples progress through the shift registers 410 and 412 so the weighting factors applied to the sample weighting circuits $W_1$ through $W_6$ are immaterial.

The third column of the table is one horizontal line period after the second column. The samples for main channel lines L2 and L3 are in shift registers 412 and 410 respectively and samples for line L5 are being applied via bus CV. In this instance, the weighting factors applied via $W_1$ through $W_6$ configure the comb filter to operate as if line L2 had been received after line L3 but before line L5.

The comb weighting factors change again one horizontal line period later, as represented by the fourth column of the table. The shift registers 410 and 412 now provide lines L5 and L3 respectively while line L6 is being received. In this instance, the weighting factors are selected to configure the apparatus to operate as a 2H comb filter in which line L6 is presumed to lie, in time, between lines L3 and L5. System operation for columns 5 and 6 of the table is the same as for columns 1 and 2 but with a different set of lines.

Returning to FIG. 3, the chrominance samples from comb filter 310 are applied to one input terminal of multiplexer 340 via bus C. The other input terminal of multiplexer 340 is coupled to bus CV. Multiplexer 340 is controlled by signal $MA_2$ from microprocessor 12 of FIG. 2 to provide the chrominance samples from comb filter 310 during main channel processing and to provide the auxiliary composite video samples from bus CV during auxiliary channel processing.

The samples provided by multiplexer 340 are applied to low-pass filter 350. For main channel processing, this filter produces samples representing the luminance vertical detail information that is included in the combed chrominance samples. These vertical detail samples are added to the luminance samples from comb filter 310 by adder 320. The main channel luminance samples from adder 320 are applied to peaking filter 330 which increases the amplitude of high frequency components of the samples relative to their low frequency components. These samples are provided to the rest of the system through output port $Y_M$ of main/auxiliary signal processor 40.

Combed chrominance samples from multiplexer 340 are also applied to delay element 352 which compensates for the processing delay through low-pass filter 350. The vertical detail samples, derived from the combed chrominance samples by low-pass filter 350, are subtracted from the delayed combed chrominance samples provided by delay element 352 in subtracter 360. The chrominance samples from subtracter 360 are filtered by band-pass filter 370 which rejects frequencies outside of the chrominance signal band to remove residual luminance signal components. These chrominance samples are applied to chroma processor 380 which produces main channel R-Y and B-Y color difference signals.

As stated above, the signal processing circuitry used for the auxiliary signal is a subset of that used for the main signal. During auxiliary signal processing, control signal $MA_2$ causes multiplexer 340 to pass the composite video samples on bus CV to low-pass filter 350. Low-pass filter 350 removes the high frequency components, including the modulated chrominance subcarrier, from the composite video samples applied to it and so provides samples representing auxiliary channel luminance. These samples are available at output port $Y_A$ of processor 40.

The auxiliary channel luminance samples are subtracted from delayed composite video samples from bus CV in subtracter 360. The delayed composite video samples are provided to subtracter 360 by delay element 352 which delays samples from multiplexer 340 by an amount of time sufficient to compensate for the processing delay of low-pass filter 350. The samples provided by subtracter 360 are effectively high-pass filtered composite video samples. These samples are applied to band-pass filter 370 which removes residual luminance components and provides auxiliary channel chrominance samples to chroma processor 380.

Chrominance samples from both the main and auxiliary channels are applied to chroma processor 380 at the $4f_{sc}$ clock rate. It can be shown that these samples occur at 90° phase intervals of the chrominance subcarrier and so represent alternating values of two quadrature phase related color difference signals. For example, if the samples from the main channel occur at phases representing the R-Y and B-Y color difference signals, the sequence of main channel samples provided to chroma processor 380 is $+(R-Y)$, $+(B-Y)$, $-(R-Y)$, $-(B-Y)$, $+(R-Y)$ ... etc. where the signs of the samples indicate sampling phase, not sample polarity. Because of signal processing delays, there may be phase errors between the samples provided to processor 380 and the R-Y and B-Y phases of the main or auxiliary channel signals. Moreover, since the auxiliary channel signals are not synchronized to the main channel signal, there may be different R-Y and B-Y reference phases for the two channels. Chroma processor 380 corrects these phase errors, providing R-Y and B-Y color difference signal samples for both the main and auxiliary channels at its output ports.

Chroma processor 380 is generally described in U.S. Pat. No. 4,558,348 entitled "A Digital Video Signal Processing System Using Asynchronous A-to-D Encoding" filed in the names of Bolger et al. on Dec. 30, 1983. The following is a description of an adaptation of this circuit for use in the present invention. To simplify the description both the main and auxiliary channel samples provided to chroma processor 380 are referred to as $(R-Y)_S$ and $(B-Y)_S$ where the subscript S indicates that there is a phase error between the sample and the true R-Y and B-Y samples respectively.

Figures 6, 12:
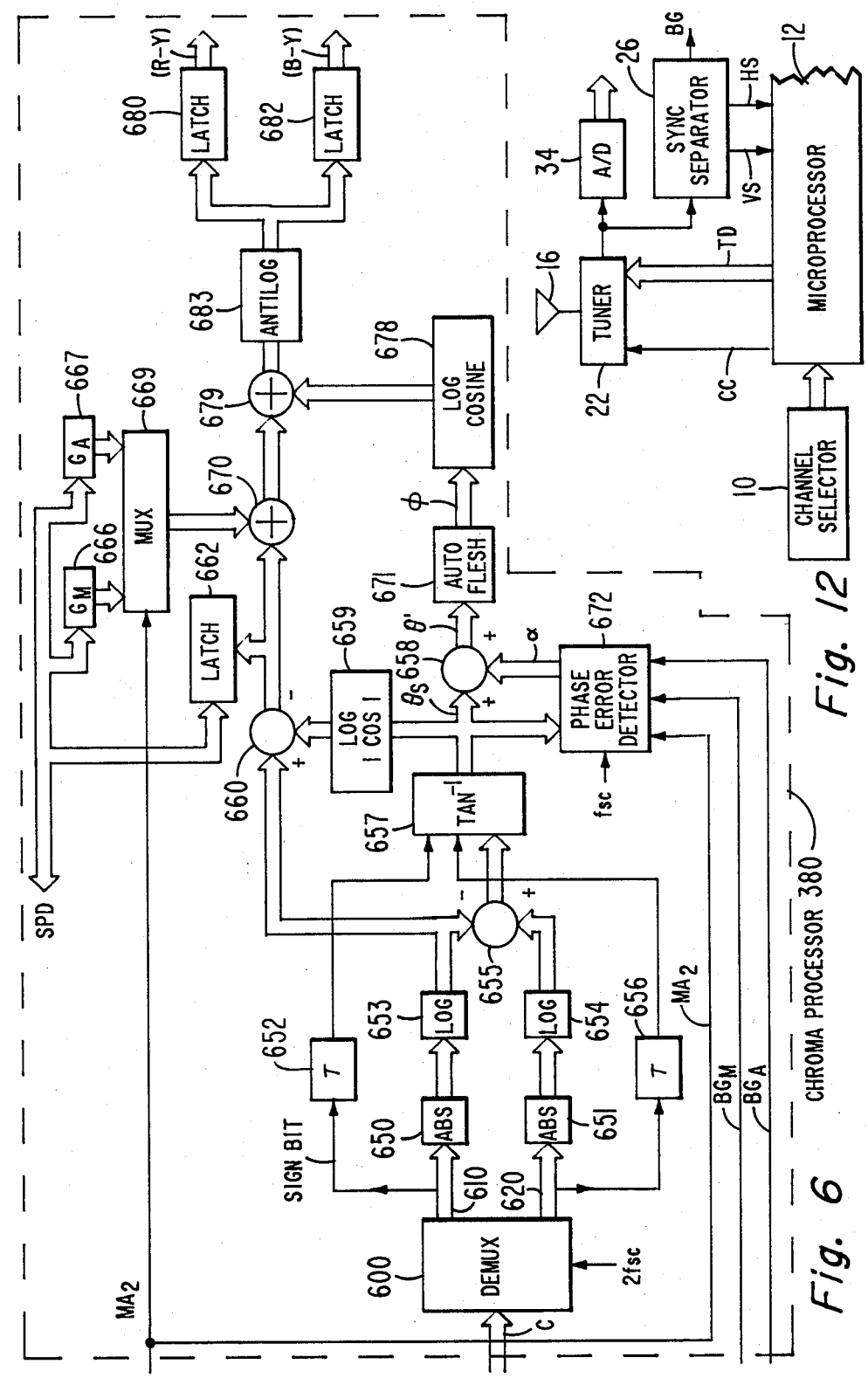
FIG. 6 is a block diagram of the chroma processing circuitry.
FIG. 12 is a block diagram of an alternate embodiment of a part of the receiver shown in FIG. 2.

Chrominance samples from band-pass filter 370 of FIG. 3 are applied to demultiplexer 600 in FIG. 6. The bandwidth of the information contained in the chrominance samples is less than 1.5 MHz. The $(R-Y)_S$ and $(B-Y)_S$ samples respectively occur at twice the subcarrier rate, e.g. 7.16 MHz for an NTSC signal. The Nyquist sampling criterion may, therefore, be satisfied if alternate $(R-Y)_S$ and alternate $(B-Y)_S$ samples are processed. The demultiplexer 600 in FIG. 6 will be assumed to provide only the $+(R-Y)_S$ and $+(B-Y)_S$ samples from recurring chrominance sequences $+(R-Y)_S$, $+(B-Y)_S$, $-(R-Y)_S$, $-(B-Y)_S$, $+(R-Y)_S$... etc.

In FIG. 6 the $(B-Y)_S$ and $(R-Y)_S$ digital signals are applied by demultiplexer 600 to busses 610 and 620. These signals are respectively applied to absolute value circuits 650 and 651 which pass the magnitudes of the $(B-Y)_S$ and $(R-Y)_S$ signals. The magnitudes of $(B-Y)_S$ and $(R-Y)_S$ are applied as address codes to ROM's 653 and 654 which are programmed to produce the logarithms of the address codes applied to their respective address input ports. The signal corresponding to the log $|(B-Y)_S|$ is subtracted from the signal corresponding to the log $|(R-Y)_S|$ in subtracter 655 which produces output signal codes corresponding to log $(|(R-Y)_S/(B-Y)_S|)$ These signal codes are applied along with the sign bits of signals $(R-Y)_S$ and $(B-Y)_S$, applied via delay elements 652 and 656 respectively, as input address codes to ROM 657 (the $(R-Y)_S$ and $(B-Y)_S$ sign bits being the most significant bits of the composite address code). ROM 657 is programmed to produce output codes corresponding to the arctangent $((B-Y)_S/(R-Y)_S)$, i.e., angles $\theta s$ which are applied to adder 658. Since the codes produced by subtracter 655 were generated from the magnitudes $|(R-Y)_S|$ and $|(B-Y)_S|$, they only represent the range of angles from zero to 90 degrees where zero degrees is defined along the $+(B-Y)$ axis. The $(R-Y)_S$ and $(B-Y)_S$ sign bits added to the address codes applied to ROM 657, provide the information needed to expand the angle information from zero to 360 degrees or from zero to $\pm 180$ degrees.

The angle codes produced by ROM 657 are also applied to the phase error detector 672. The phase error detector—which will be described with reference to FIG. 7—under control of the burst gate signals, examines the angle codes representing the chrominance phase angle during the burst intervals of the main and auxiliary signals. Circuit 672 calculates the difference, $\alpha$, between the phase angles represented by the $(R-Y)_S$ and $(B-Y)_S$ samples of the main and auxiliary burst signals and the phase angles that would be produced were the samples taken in phase with the desired or correct axes R-Y and B-Y. The angles, $\alpha$, for the main and auxiliary signals are stored until the next burst interval and are applied to adder circuit 658, when appropriate, during the period between burst intervals. Adder circuit 658 sums the angles $\theta s$ and $\alpha$ to produce corrected angles $\theta'$.

Digital codes corresponding to angle $\theta'$ from ADDER 658 are applied to circuit 671 which produces flesh corrected digital codes corresponding to angles $\phi$. Circuit 671 may be a ROM programmed to provide a non-linear transfer function which produces flesh corrected angles $\phi$ for angles $\theta'$—representing chrominance angles normally associated with flesh colors—applied as address codes. For angles $\theta'$, which do not represent chrominance angles in the range of flesh colors, the angles $\phi$ produced by circuit 671 equal the angles $\theta'$. For example, ROM 671 may be programmed to generate angles $\phi$ equal to $(\theta'-K \sin 2\theta')$ for angles $\theta'$ equal to $\pm 90$ degrees and angles $\phi$ equal to angles $\theta'$ for angles $\theta$ from $\pm 90$ degrees to $\pm 180$ degrees.

Angles $\phi$ from circuit 671 are applied as address codes directly to ROM 678 programmed to produce the sines and cosines of angles $\phi$. The sines and cosines are then multiplied by the magnitude value, $C_B$, of the vector sum of $(R-Y)_S$ and $(B-Y)_S$, to produce flesh tone corrected quadrature signals R-Y and B-Y.

The magnitude, $C_B$ of the vector sum of $(R-Y)_S$ and $(B-Y)_S$ in the FIG. 6 embodiment is generated according to the equation $$C_B = |(B-Y)_S/|\cos\theta s. \tag{1}$$

To this end the angles $\theta s$ from elements 657 are applied as address codes to a ROM 659 which is programmed to produce the log $|\cos\theta s|$ of the angle $\theta s$ signal codes applied to its address input. The log $|\cos\theta s|$ codewords from ROM 659 are applied to one input port of a subtracter circuit 660 wherein they are subtracted from the log $|(B-Y)_S|$ codewords from ROM 653 to produce a signal corresponding to log $(|B-Y)_S|/|\cos\theta s|)$. This signal is applied to ADDER 670 and ACC latch 662. Automatic Chrominance Control (ACC) is performed by microprocessor 12 of FIG. 2 which periodically calculates the products G=ACC.Sat equal to the products of the ACC control signal and the saturation control signal.

Microprocessor 12 periodically reads the contents of the latch 662 via data bus SPD. These values may be read, for example, during the main and auxiliary channel color burst intervals. The microprocessor compares the read values against a predetermined reference value, e.g. 20 IRE and generates the logarithms of the composite gain factors $G_M$ and $G_A$ for the main and auxiliary signals respectively. These gain factors are provided to buffers 666 and 667 respectively via bus SPD. From buffers 666 and 667 the gain factors are applied to ADDER 670 by multiplexer 669 where they are added to the log $(|B-Y)_S|/|\cos\theta s|)$ signal to produce signal samples corresponding to log $(GC_B)$. These samples or codewords are applied to adder 679 where they are combined with the log $(\cos\phi)$ signals.

Multiplexer 669 is controlled by the main/auxiliary control signal $MA_2$ from microprocessor 12. The signal $MA_2$ selects the gain factor from latch 666 when main channel chrominance samples are being processed and from latch 667 when auxiliary channel samples are being processed.

The signal generator for developing the timing signals applied to the FIG. 6 circuitry is not shown because it is not considered part of this invention. These signals may be developed by conventional techniques which are known by those skilled in the art.

Figure 7:
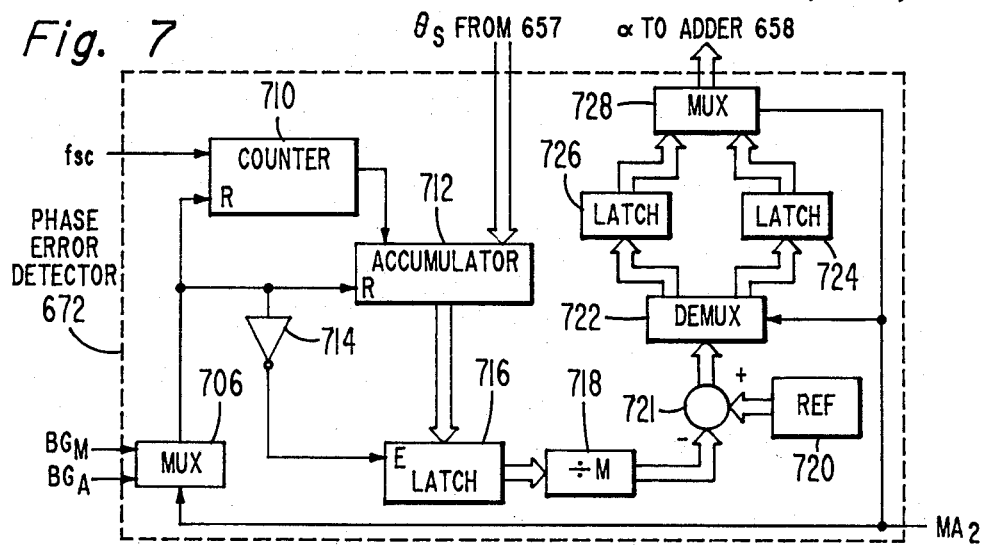
FIG. 7 is a block diagram of the phase error detector used in the chroma processor shown in FIG. 6.

FIG. 7 shows exemplary circuitry for developing the phase angle error signals $\alpha$. In FIG. 7, angle values $\theta s$ are applied to an accumulator 712 under the control of a burst gate signal. The burst gate signal applied to the accumulator is either the main channel burst gate signal, $BG_M$, from sync separator 28 or the auxiliary channel burst gate signal, $BG_A$, from sync separator 26. The main channel burst gate signal, $BG_M$, is applied to one input terminal of multiplexer 706 and the auxiliary channel burst gate signal, $BG_A$, is applied to its other input terminal. Multiplexer 706 is controlled by main/auxiliary control signal $MA_2$ to provide the main channel burst signal during main channel signal processing and the auxiliary channel burst signal during auxiliary channel signal processing. Counter 710 is reset by the leading transition of the burst gate pulse from multiplexer 706. Counter 710, responsive to the reset pulse, produces an enabling output potential which is applied to accumulator 712. An $f_{sc}$ clock signal, synchronous with the occurrence of angle values $\theta$s, is applied to the clock input of the counter. The counter effectively counts a prescribed number, e.g. M, of the $f_{sc}$ clock signals. After the prescribed number of clock pulses have occurred, the output potential of the counter changes to a potential value which disables accumulator 712. The enabling signal from counter 710 is of such duration to permit M consecutive angle values from circuit 657 to be input to the accumulator 712 during the burst interval. The M angle values will nominally be selected from the center of the burst sequence of reference cycles. Accumulator 712 sums the applied burst phasor angle values. The accumulator may consist of an adder and a latch (not shown). The respective inputs of the adder are coupled to the output of the latch and the input of the accumulator. The output of the adder is coupled to the output of the accumulator and the input of the latch. In operation, each successive sum from the adder is input to the latch from which it is available to be added to the next input value.

The output sum from the accumulator is applied to the latch 716 at the end of the burst interval by the complement of the burst gate signal. More particularly, the burst gate signal is applied to the inverter 714 which inverts the signal. The falling or trailing edge of the burst gate pulse is converted to a rising potential transition at the output terminal of inverter 714. Latch 716, in response to the rising transition of the inverted burst gate pulse, stores the value currently applied to its input port. This value is stored for one line period or until the termination of the next subsequent burst gate pulse.

The output of the latch 716 is applied to the divider circuit 718 which divides the applied value by M to produce an average value of the angle $\theta$s. It will be appreciated by those skilled in the art of digital signal processing that divider circuit 718 may be positioned to preceed latch 716. Further, if the value M is an integral power of two the divider 718 may be eliminated and division may be accomplished by shifting the bits of the PCM codeword rightward to lesser significant bit positions.

The output value from divider circuit 718 is applied as subtrahend to subtractor circuit 721 and a reference angle value, e.g. 0 degrees, from source 720 is applied as minuend to subtractor circuit 721. Subtractor 721 produces a difference value corresponding to the angle $\alpha$ and which is equal to the reference angle minus the average value of $\theta$s determined over the burst interval. This difference value is applied to the input terminal of demultiplexer 722, which under control of signal MA$_2$ from microprocessor 12 applies main channel values to latch 726 and auxiliary channel values to latch 724. Latches 726 and 724 respectively retain the last difference value calculated for the main channel while auxiliary channel samples are processed and the last value calculated for the auxiliary channel while main channel samples are processed. The output terminals of these latches are connected to the input terminals of multiplexer 728 which provides the main channel $\alpha$ value to adder 658 of FIG. 6 during main channel signal processing and provides the auxiliary channel $\alpha$ value during auxiliary channel processing. Multiplexer 728 is controlled by signal MA$_2$ from microprocessor 12.

If the correction angles $\alpha$ change significantly from line-to-line, the value $\alpha$ applied to adder 658 will be substantially in error towards the end of respective line intervals. System performance may be enhanced by incrementing/decrementing the value $\alpha$ for the main or auxiliary signals proportional to the change of the value of the respective $\alpha$ between preceding lines. For example, if the lastmost angle $\alpha$ for the auxiliary channel increased by four degrees over the preceding auxiliary $\alpha$ value, it may be anticipated that the nextmost value of $\alpha$ for the auxiliary channel will also be increased by four degrees over the present value. System performance may be enhanced if the value of $\alpha$ is successively increased by one degree at quarter line intervals so that, at most, the anticipated error in $\alpha$ will be only one degree. More or less, corrections to $\alpha$ can be made over the line interval as desired. Apparatus to correct the value of $\alpha$ at intervals of less than one horizontal line is not shown since it is not considered part of the present invention. One skilled in the art can readily adapt the circuitry shown in FIG. 7 to implement this method of phase angle correction if the phase shift across a single horizontal line is deemed excessive.

Returning to FIG. 2, the auxiliary channel luminance and color difference samples provided by processor 40 at output ports $Y_A$, $(R-Y)_A$ and $(B-Y)_A$ are applied to auxiliary memory 50. Memory 50, under the control of signal MA$_3$ from microprocessor 12, stores every fourth sample of the luminance signal and every fourth sample of each of the R-Y and B-Y color difference signals for a sufficient number of lines to reproduce the auxiliary image (e.g. 64 for NTSC). Control signal MA$_3$ is a delayed replica of signal MA$_2$. It is in a logic low state only when auxiliary channel samples are available at ports $Y_A$, $(R-Y)_A$ and $(B-Y)_A$.

The lines of samples are retrieved from the memory to be displayed as an inset in the main picture. Luminance and color difference signal samples are read from the memory at four times their input rate to produce auxiliary picture lines that are one-quarter the length of the lines of the main picture. The reading of the contents of auxiliary memory 50 is controlled by signal $S_M$ from multiplexer control circuit 60.

Auxiliary channel signal processing and, so the writing of data into the auxiliary memory 50, is synchronized to the auxiliary signal. However, the reading of data from the auxiliary memory 50 for display is synchronized to the main channel signal. Since the auxiliary and main channel signals are asynchronous and since auxiliary channel signals may be processed as the auxiliary image is displayed, there may be times when memory 50 is accessed both to write and to read data. To prevent data corruption due to simultaneous read and write access, the auxiliary memory 50 includes two stages: a buffer for receiving processed auxiliary data and a random access memory (RAM) for storing the data to be displayed. The writing of data into the buffer is synchronized to the auxiliary signal while transfers between the buffer and the RAM and the reading of data from the RAM are synchronized to the main signal. In the present embodiment, samples are loaded into the buffer at one-quarter the rate at which they are supplied by processor 44. This results in a four-to-one compression of the auxiliary image lines. Samples are transferred from the buffer to the RAM at four times this buffer storage rate. All transfers occur coincident with the leading edge of the second main channel horizontal sync pulse following each auxiliary signal processing interval. The transfers are complete one-quarter of a horizontal line period later. There is no interference between the transfers and the reading of the auxiliary memory which, as explained below, starts after three-eighths of a main channel line has been displayed.

Figure 8A:
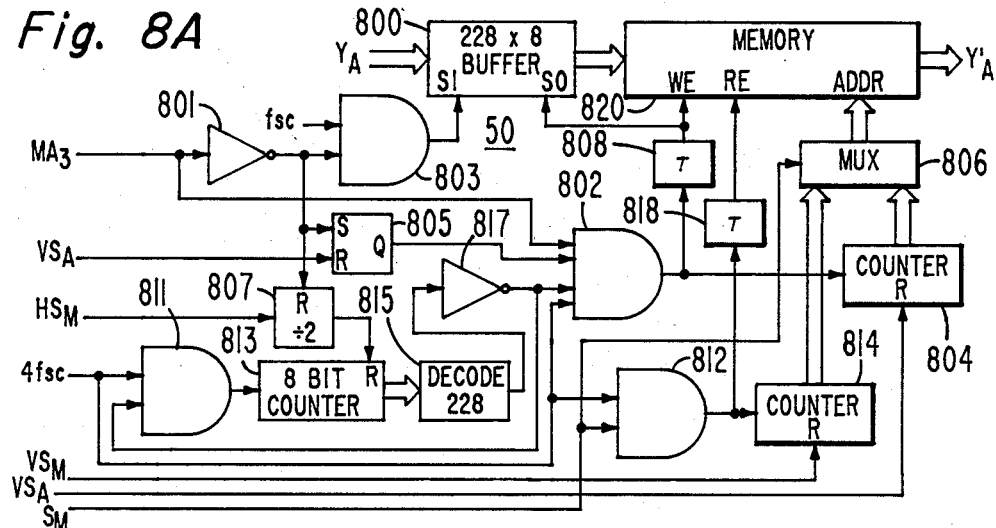
FIGS. 8A and 8B are block diagrams of the auxiliary signal memories used in the receiver shown in FIG. 2.

FIG. 8A is a block diagram of the part of the auxiliary memory 50 in which luminance samples are stored. Buffer 800, which may be a 228×8 first-in-first-out (FIFO) register, has an input port connected to the output port $Y_A$ of signal processor 40, an output port connected to the input port of RAM 820, a shift-in control terminal, SI, and a shift-out control terminal, SO. Data is written into the buffer when pulses are applied to terminal SI and data is read from the buffer when pulses are applied to terminal SO.

The shift-in pulses applied to terminal SI are developed from an $f_{sc}$ clock signal and the main/auxiliary control signal $MA_3$ from microprocessor 12. $MA_3$ is applied to inverter 801 which provides an input signal to AND gate 803. The other input to AND gate 803 is provided by clock signal $f_{sc}$. The output signal of gate 803 is an $f_{sc}$ clock signal when $MA_3$ is in a logic low state, i.e. when auxiliary channel luminance samples are available at output port $Y_A$ of processor 40, and a logic low signal otherwise. This output signal is applied to terminal SI of buffer 800 and conditions the buffer to store every fourth one of the auxiliary luminance samples provided by processor 40.

Data transfer from the buffer to the RAM occurs while main channel lines are being processed. Transfers occur during only one of the two fields that make up an auxiliary frame since auxiliary channel lines are processed during only one of the two fields. The transfer pulses are generated from signals $MA_3$; $VS_A$, the auxiliary channel vertical sync signal from auxiliary sync separator 26; $HS_M$, the main channel horizontal sync signal from the main channel sync separator 28; and the $4f_{sc}$ clock signal from PLL 30.

Transfer pulses are developed by AND gate 802. These pulses are applied to counter 804, which develops write addresses that are applied to RAM 820 via multiplexer 806. The counter is reset to zero by the auxiliary channel vertical sync pulses applied to its reset input.

The transfer pulses from AND gate 802 are applied, through delay element 808, to the shift-out terminal, SO, of buffer 800 and to the write enable terminal WE of RAM 820. These pulses condition the buffer to provide data at its output and condition the RAM to write the data into the addressed cells. Delay element 808 delays the transfer pulses a sufficient time to allow the write addresses to stabilize in the RAM.

One input terminal of AND gate 802 is coupled to receive a $4f_{sc}$ clock signal. This signal controls the rate at which the data are transferred; the other signals applied to AND gate 802 control when the transfer occurs. Signal $MA_3$ is applied to one input terminal of AND gate 802 to prevent it from developing transfer pulses when data is being written into buffer 800. The inverse of signal $MA_3$, from inverter 801 is applied to the set input (S) of RS flip-flop 805 and the auxiliary channel vertical sync signal, $VS_A$, is applied to the reset input (R). Flip-flop 805 is reset at the end of each auxiliary field and set as the first auxiliary channel line of a given field is processed. The output signal of flip-flop 805 is applied to AND gate 802 to prevent the gate from developing transfer pulses during fields for which no auxiliary signal lines are processed.

The last input to AND gate 802 controls the position in the main channel horizontal line period, at which a transfer occurs. Frequency divider 807, which may be a conventional divide by two circuit, has the main channel horizontal sync signal, $HS_M$, applied to its signal input terminal and the inverted main/auxiliary control signal, $MA_3$, applied to its reset input terminal. Consequently, divider 807 produces a logic low state while auxiliary channel data is being written into the buffer 800. This signal changes to a logic high state with the leading edge of the first main channel horizontal sync pulse subsequent to auxiliary signal processing. The next main channel horizontal sync pulse changes the output signal of the divider 807 to a logic low state. This output signal is applied to the reset input terminal of 8 bit counter 813.

Counter 813 has a $4f_{sc}$ clock signal from AND gate 811 applied to its signal input terminal. The 8 bit output signal of counter 813 is applied to decoder 815. Decoder 815 produces a signal having a logic high state when the value supplied by the counter is 228. The output signal from decoder 815 is applied to inverter 817 which provides one input to AND gate 811. The other input to gate 811 is the $4f_{sc}$ clock signal. AND gate 811 provides the $4f_{sc}$ clock signal to counter 813 from the time the counter is reset until 228 pulses have been counted. The circuit formed by divider 807, AND gate 811, counter 813, decoder 815 and inverter 817 provides a signal, available at the output of inverter 817, which has a logic high state starting at a point in time coincident with the leading edge of the second horizontal sync pulse following auxiliary signal processing, and remaining in a logic high state for 228 pulses of the $4f_{sc}$ clock (¼ H). This signal is applied to an input of AND gate 802 to condition the gate to provide 228 transfer pulses during each of these intervals.

The reading of samples from the RAM 820 is controlled by the $4f_{sc}$ clock signal, the select signal, $S_M$, from multiplexer control circuit 60 and the main channel vertical sync signal $VS_M$ from main sync separator 28. The select signal SM and the $4f_{sc}$ clock signal are applied to AND gate 812. Consequently, AND gate 812 produces a $4f_{sc}$ clock signal when multiplexer control circuit 60 selects auxiliary channel samples for display. Multiplexer control circuit 60 is described in more detail below. The signal provided by AND gate 812 is applied to counter 814 and to delay element 818. Counter 814 develops the read addresses that are applied to RAM 820 via multiplexer 806. Multiplexer 806 is controlled by signal SM to provide read addresses from counter 814 when auxiliary channel samples are selected for display and to provide write addresses from counter 804 otherwise. Main channel vertical sync pulses $VS_M$ are applied to the reset input of counter 814 to return the read addresses to a starting point at the end of each main channel field.

Delay element 818 delays the read pulses applied to its input by AND gate 812 by a time sufficient to allow the read addresses to stabilize in the RAM. These delayed pulses are applied to the read enable input of RAM 820 to condition the RAM to provide the digital samples from the addressed cells at its output port $Y_A'$.

Figure 8B:
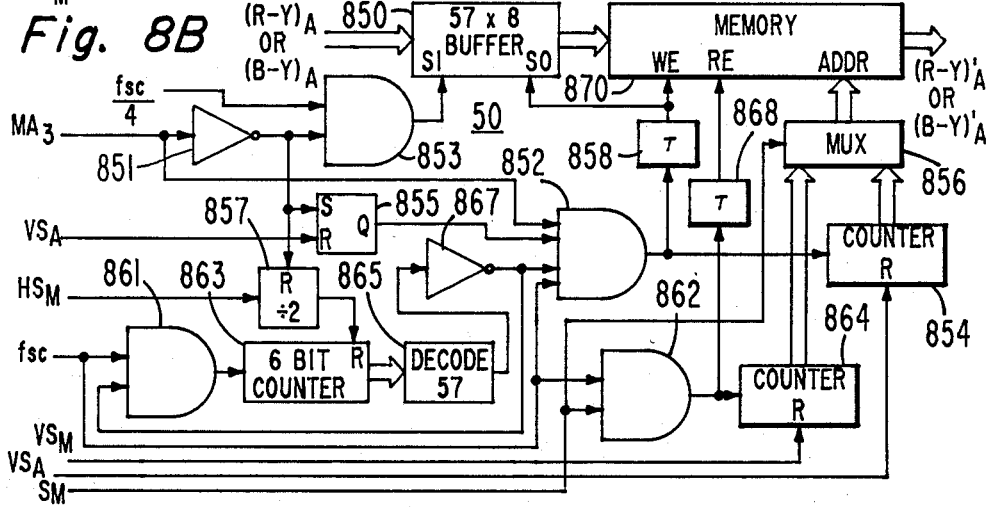

The portions of memory 50 which store the two sampled color difference signals are identical, so only one is shown in FIG. 8B. This memory is essentially the same as the luminance sample memory shown in FIG.

8A. The only differences are the frequencies of the clock signals and the number of cells in the buffer and RAM. An $f_{sc}$ clock signal is applied to one input of gate 861 of FIG. 8B instead of the $4f_{sc}$ signal applied to gate 811 of FIG. 8A and an $f_{sc}/4$ clock signal is applied to one input of gate 853 of FIG. 8B instead of the $f_{sc}$ signal applied to gate 803 of FIG. 8A. Reduced rate clock signals are used because of the lower data rate of the color difference signals relative to the luminance signal. In addition, a smaller buffer containing 57 instead of 228 cells, is used to store the color difference samples provided by processor 40. A proportionally smaller RAM is also used for the color difference samples than is used for the luminance samples. Otherwise, the memories shown in FIGS. 8A and 8B are identical. The apparatus used to develop the clock signals $f_{sc}$ and $f_{sc}/4$ is not shown since it is not considered a part of the invention. These signals may be developed by conventional techniques which are known to those skilled in the art.

The luminance and color difference samples from the output ports $Y_A'$, $(R-Y)_A'$ and $(B-Y)_A'$ of auxiliary memory 50 are applied to one set of inputs of the main/auxiliary signal multiplexer 52. Another set of inputs to multiplexer 52 are main channel luminance and color difference samples from the output ports $Y_M$, $(R-Y)_M$ and $(B-Y)_M$ of signal processor 40. The third set of input signals applied to multiplexer 52 are provided by the $Y'_M$, $(R-Y)'_M$ and $(B-Y)'_M$ output ports of main memory 70.

Main memory 70 includes three 1H shift registers, one each for the luminance, R-Y and B-Y color difference signals of the main channel. Luminance samples from output port $Y_M$ of processor 40 are applied to the input port of 1H shift register 900 shown in FIG. 9A. Register 900 may be a conventional shift register containing a sufficient number of stages to store one horizontal line of samples provided at a $4f_{sc}$ rate (e.g. 910 stages for NTSC). Samples available at the output port $Y'_M$ of shift register 900 are main channel luminance samples delayed by one line period.

FIG. 9B is a block diagram of one of the two color difference signal memories of main memory 70. These memories are also 1H shift registers, however, because of the lower sample rate of the digital color difference signals provided by processor 40, the shift registers 950 are clocked at a lower rate, $f_{sc}$, and contain fewer cells (e.g. 228 for NTSC).

The select signal, $S_M$, from multiplexer control circuit 60 and the main/auxiliary control signal, $MA_4$, from microprocessor 12 determine which of the three sets of luminance and color difference signals is provided at the output ports Y, (R-Y) and (B-Y) of multiplexer 52. Main/auxiliary control signal $MA_4$ switches the multiplexer between providing main channel samples from processor 40 or from main memory 70. Control signal $MA_4$ is generated by microprocessor 12; it has the same properties as signals $MA_1$ through $MA_3$ described above but is delayed with respect to these signals.

When $MA_4$ is in a logic high state, multiplexer 52 provides main channel samples from processor 40. However, when $MA_4$ is in a logic low state, i.e. when processor 40 is supplying auxiliary channel samples, multiplexer 52 provides samples from main memory 70.

The select signal $S_M$ from multiplexer control circuit 60 switches the multiplexer between providing main and auxiliary channel samples. When $S_M$ is in a logic low state, main channel samples from processor 40 or from memory 70 are provided by multiplexer 52. When $S_M$ is in a logic high state multiplexer 52 provides auxiliary channel samples from auxiliary memory 50. The generation of $S_M$ is described in more detail below, in reference to FIG. 10.

The luminance signal from port Y and the color difference signals from ports (R-Y) and (B-Y) of multiplexer 52 are applied to the inputs of digital matrix 80 which combines the luminance and the R-Y and B-Y color difference signals to produce the three primary color signals, R, G and B which may be applied, for example, to a display device (not shown). A suitable digital matrix for use in the present embodiment can be assembled by one skilled in the art from conventional circuit elements. This circuitry is not shown because it is not considered part of this invention.

As stated above, the signal $S_M$ which controls the unloading of auxiliary memory 50 and the routing of signals in multiplexer 52 is generated by multiplexer control circuit 60. The input signals applied to this circuit are the $4f_{sc}$ clock from PLL 30, and the delayed main channel horizontal and vertical sync pulses from main sync separator 28. These sync pulses are applied to delay elements 62 and 64 respectively which provide sufficient delay to synchronize these sync pulses to the processed luminance and color difference signals from processor 40. Control circuit 60 is not shown in detail because it is not considered part of the invention. It can be made from conventional components including counters and other logic by one skilled in the art with the aid of the timing diagram shown in FIG. 10. In FIG. 10, the waveforms labeled $HS_M$ and $VS_M$ represent the horizontal and vertical sync signals applied to control circuit 60. The waveform labeled $Y_M$ represents the main channel luminance signal provided by processor 40. The waveform labeled $S_M$ in FIG. 10 represents the signal $S_M$ produced by control circuit 60.

FIG. 10 shows selected lines from one field and the first two lines from the subsequent field of an NTSC video signal. The numbers across the top of the figure represent the numbers of lines in the fields. FIG. 10 also includes representations of the equalizing pulses and vertical synchronization pulses that occur between the fields.

The signal $S_M$ consists of a series of pulses, each pulse being $\frac{1}{4}$ H wide and separated from the next pulse by a $\frac{3}{4}$ H interval. If the auxiliary image is positioned at the bottom of the main image, as shown in FIG. 1, the pulses occur only during lines 189 through 252, the last one-quarter of the lines of an NTSC field. When signal $S_M$ is in a high logic state multiplexer 52 is conditioned to provide auxiliary channel samples to matrix 80 and main memory 70. When $S_M$ is in a low logic state, however, the main channel samples from processor 40 are provided by multiplexer 52. The multiplexer 52 switches between supplying main and auxiliary channel samples to produce a composite main and auxiliary picture as shown in FIG. 1.

Figure 11:
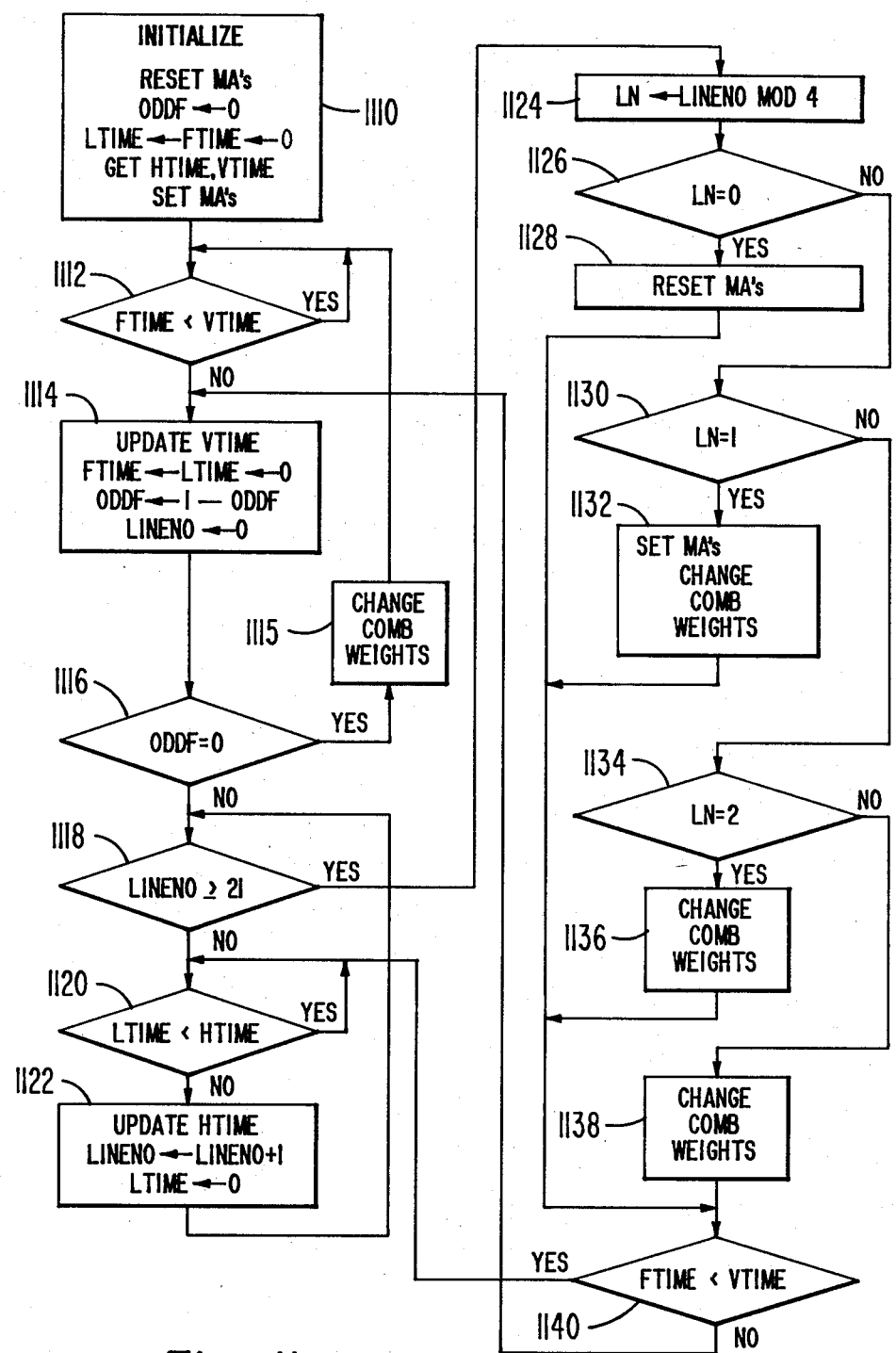
FIG. 11 is a flow diagram useful for explaining the operation of the television receiver shown in FIG. 2.

Microprocessor 12 controls the main and auxiliary signal processing in this embodiment of the invention. FIG. 11 is a flow diagram showing the control sequence of the microprocessor 12. Block 1110 represents the initialization sequence of the microprocessor. The first step in block 1110 is to reset the main/auxiliary control signals $MA_1$ through $MA_4$. As stated above, these signals are set to a logic high state for main channel signal processing and reset to a logic low state for auxiliary channel processing. Signals $MA_2$ through $MA_4$ are delayed with respect to MA₁ by different amounts, increasingly greater subscript values indicating increasingly greater delays. Each signal controls a different stage of the pipelined signal processing performed by the receiver. Accordingly, the step 'RESET MAs' resets MA₁, then MA₂, then MA₃ and then MA₄. The amount of delay between changing any two MA signals depends on the processing delay between the devices controlled by the signals. If the delay is an integral number of microprocessor instruction cycles then the signals can be changed by the microprocessor directly, otherwise the microprocessor may, for example, provide one signal to a three stage delay network (not shown) which provides the other three signals. Of course, the above also applies for any 'SET MAs' steps where each of the MA signals are changed from a low logic state to a high logic state.

The second step in the initialization block 1110 is to assign 0 to the variable ODDF. ODDF indicates whether the lines being processed are from an odd or even field (ODDF=1 and ODDF=0 respectively). This variable is used to ensure that auxiliary image lines are taken from every other field (i.e. from every odd field) of the auxiliary signal. The third initialization step resets the counters LTIME and FTIME to 0. Counters LTIME and FTIME may be internal to the microprocessor and incremented by one for each clock pulse. These counters hold the number of $4f_{sc}$ clock pulses that have occurred since the last horizontal sync pulse (LTIME) and since the last vertical sync pulse (FTIME). LTIME and FTIME are used by the microprocessor to synchronize the signals it provides with the auxiliary channel horizontal and vertical sync pulses respectively. In a microprocessor without accessible internal counters, LTIME and FTIME may be realized as functions of the $4f_{sc}$ system clock. FTIME, for example, may be the system clock minus a variable. In this situation, the program step that resets the counter FTIME would, instead, assign the current value of the system clock to the variable.

The fourth step in the initialization sequence is to monitor the auxiliary channel signal for at least one frame time to get an accurate estimate of the number of clock pulses between successive auxiliary channel horizontal sync pulses and between successive auxiliary channel vertical sync pulses. This may be accomplished by, for example, having the horizontal and vertical sync pulses from sync separator 26 activate different vectored interrupts. The interrupt subroutine which handles the particular interrupt may average its current value of HTIME, the time between auxiliary signal horizontal sync pulses, or VTIME, the time between auxiliary signal vertical sync pulses, with the difference between the values of the system clock for this interrupt and for the previous interrupt. This step in the initialization sequence monitors the auxiliary channel signals for at least one frame time, until the last line of an even field. The microprocessor may distinguish odd fields from even fields, for example, by monitoring the amount of time between the last horizontal sync pulse and the first equalization pulse. This time is longer for even fields than for odd fields.

The final step in the initialization sequence 1110 is to set the main/auxiliary control signals, MA₁ through MA₄, so that main channel signals are processed and displayed.

Decision block 1112 synchronizes the control sequence of the microprocessor to the auxiliary channel vertical sync signal by circulating through a loop until the value in counter FTIME is greater than or equal to the calculated time between auxiliary signal vertical sync pulses, VTIME.

When FTIME is greater than or equal to VTIME microprocessor 12 executes the instructions shown in block 1114. The first step in block 1114 is to update VTIME. This step is actually performed in the interrupt subroutine linked to the vertical sync interrupt. It is placed here in the microprocessor control sequence to indicate approximately when it occurs. The next two steps in block 1114 reset the auxiliary channel field and line time counters FTIME and LTIME to zero and change the value of the auxiliary channel odd field indicator ODDF between 1 and 0. If ODDF was 1 for the last field processed it is changed to 0 for this field and if it was 0 for the last field, it is changed to 1 for this field. The final step in block 1114 assigns the value 0 to the variable LINENO. LINENO is incremented by one for each horizontal line period of the auxiliary signal, so it holds the line number of the current line of the auxiliary picture. LINENO is used by the microprocessor to set and reset the MA signals and to change the weighting factors applied to comb filter 310.

Decision block 1116 is the next step in the instruction sequence of the microprocessor after block 1114. If the variable ODDF has a 0 value, indicating that the auxiliary channel is providing an even field, the microprocessor branches to block 1115. Block 1115 changes the weighting factors of comb filter 310 to those shown in column 1 of the table in FIG. 5. These comb weights are appropriate for processing three successive lines from the main picture. They are used during the even field time of the auxiliary signal since only lines of the main picture are processed in this interval. From block 1115, the next step in the microprocessor control sequence is the decision block 1112 which causes the microprocessor to circulate in a loop until the next vertical sync pulse occurs.

If the variable ODDF has a value of 1 in block 1116, the next step in the control sequence of the microprocessor is decision block 1118. Block 1118 is the first block in the loop which handles the blank lines at the beginning of a field. In the NTSC system, there are 21 such line intervals. Decision block 1118 compares the auxiliary channel line number, stored in the variable LINENO, with the value 21. While the value of LINENO is less than 21, the microprocessor program steps from block to 118 to block 1120. Decision block 1118 is a loop which waits until the end of a horizontal line. If the counter variable LTIME has a value less than the predetermined horizontal line time, HTIME, the block branches back to itself and performs the test again. When LTIME is greater than or equal to HTIME, however, the control sequence switches to block 1122. Block 1122 updates the variable HTIME, increments the value of LINENO and resets the line time counter LTIME. From block 1122 the microprocessor steps back to the beginning of the loop, decision block 1118.

When LINENO is incremented to have a value greater than or equal to 21, decision block 1118 causes the microprocessor control sequence to branch to block 1124. Block 1124 is the first step of auxiliary signal image processing. In this step the modulo 4 value of the auxiliary channel line number, LINENO, is placed into the variable LN and the control sequence steps to block 1126. If LN is equal to 0, decision block 1126 causes the program to step to block 1128, otherwise the program steps to block 1130. When LN is 0, the current auxiliary channel line has a line number, LINENO, that is evenly divisible by four. The lines that satisfy this condition are chosen in the present embodiment to make up the auxiliary image. Accordingly, block 1128 resets the main-/auxiliary control signals MA$_1$ through MA$_4$, causing the system to switch from processing main channel signals to processing auxiliary channel signals. From block 1128, the microprocessor program steps to decision block 1140. Block 1140 causes the program to branch to decision block 1120 if there are more lines to be processed in the current field. If there are no more lines in the current field (i.e. FTIME is greater than or equal to VTIME), decision block 1140 causes the microprocessor to branch to block 1114 and begin processing the next field.

If LN is not equal to 0, in decision block 1126, then the microprocessor steps to decision block 1130. Block 1130 steps the program to block 1132 if LN is equal to 1 and steps to decision block 1134 otherwise. Block 1132 controls the processing of the main channel lines that immediately follow the chosen auxiliary channel lines. The first step in block 1132 sets the signals MA$_1$ through MA$_4$ to resume main signal processing. The second step changes the weighting factors applied to comb filter 310 of FIG. 3 to be those shown in the third column of the table in FIG. 5. The program step following block 1132 is decision block 1140 described above.

If variable LN does not have a value of 1, block 1130 steps the program to decision block 1134. Block 1134 steps to block 1136 if LN has a value of 2 and to block 1138 otherwise (i.e. if LN has a value of 3). Blocks 1136 and 1138 change the weighting factors applied to comb filter 310 to be those shown in the fourth and fifth columns of the table in FIG. 5 respectively. From both blocks 1136 and 1138, the program steps to block 1140, described above.

The microprocessor continues in this control loop until a new auxiliary channel is chosen. When this occurs, channel selector 10 of FIG. 2 signals the microprocessor to step to initialization block 1110.

The other function of microprocessor 12 is to control the chrominance gain by monitoring, via data bus SPD, the main and auxiliary channel samples from chroma processor 380 of FIG. 3 and by supplying gain factors for the main and auxiliary channels to this processor, via bus SPD. The control flow for this function is not shown since it is not considered a part of the invention. This function may be integrated into the main and auxiliary processing steps of the program shown in FIG. 11 by programming techniques known to those skilled in the art.

The pix-in-pix receiver described above uses two tuners, two IF amplifiers and two demodulator systems, one for the main channel and one for the auxiliary channel. A more economical system would use only one of each of these systems. Since the present invention operates on time-division multiplexed signals and since its signal processing is pipelined, it is particulary suited for use in a single tuner pix-in-pix receiver. FIG. 12 is a block diagram of the part of the receiver shown in FIG. 2 that would need to be changed to produce a receiver using only one tuner. Channel selector 10 provides a data signal to microprocessor 12 indicating the channel number of a selected channel and whether it is the main or auxiliary channel. Microprocessor 12 converts the channel number into control signals for tuner 22. The control signals are passed to the tuner via data bus TD when the channels are selected. Thereafter, tuner 22 stores these control signals in its local memory. Switching between the main and auxiliary channels is controlled by a single bit signal applied to the tuner 22 by microprocessor 12 via connection CC. Analog composite video signals from tuner 22 are applied to A/D converter 34 and to sync separator 26. A/D converter 34 is driven by a clock synchronized to the main channel burst and provides digital samples of the main and auxiliary composite video signals to the rest of the receiver. Sync separator 26 provides both the main and auxiliary channel horizontal and vertical sync pulses. These are used to synchronize conventional horizontal and vertical oscillators (not shown) to provide continual pulses for both the main and auxiliary channels. The pulses from the auxiliary channel horizontal and vertical oscillators may be applied, in lieu of actual horizontal and vertical sync pulses, to synchronize microprocesor 12 to the auxiliary signals. Alternatively, sync pulses from sync separator 26 may be applied directly to the microprocessor 12. In this instance, it would be desirable to add program steps to the interrupt subroutines linked to the horizontal and vertical sync signals to differentiate between the main and auxiliary pulses. These program steps may, for example, synchronize only to those pulses that occur at intervals close to multiples of the calculated intervals for the auxiliary channel horizontal and vertical sync pulses. The burst gate signal provided by sync separator 26 is, likewise, the burst gate signal for both the main and auxiliary signals.

The output pulses from the auxiliary channel horizontal and vertical oscillators condition microprocessor 12 to switch the tuner between the main and auxiliary channels. As in the main embodiment, the tuner is switched from the main channel to the auxiliary channel immediately prior to the leading edge of the auxiliary channel horizontal sync pulse of every fourth line of one of the two fields that make up each frame of the auxiliary picture. The tuner is switched from the auxiliary channel to the main channel immediately after the end of active video on these lines.

What is claimed is:

1. In a video signal processing system including a source of time-division multiplexed video signal having alternating first and second mutually independent composite video signal components each having luminance signal components and chrominance signal components including a color burst signal component, apparatus comprising:

an oscillator for generating a reference clock signal having a frequency substantially equal to an integral multiple of the frequency of the color burst signal component of said first composite video signal component;

filtering means, responsive to said time-division multiplexed composite video signal for separating the chrominance signal components therefrom to provide a time-division multiplexed chrominance signal having alternating first and second chrominance signal components corresponding respectively to said first and second composite video signal components; and synchronizing means responsive to said time-division multiplexed chrominance signal, to said reference clock signal and to said color burst signal components for producing first and second phase corrected chrominance signals, each having a predetermined phase relationship with respect to said reference clock signal.

2. The apparatus set forth in claim 1 wherein said oscillator includes a phase locked loop coupled to said source for providing a reference clock signal having a predetermined phase relationship with respect to the color burst signal component of said first composite video signal component.

3. The apparatus set forth in claim 1 wherein the chrominance signal components of said first and second composite video signal components each includes two quadrature phase related color difference signal components, said apparatus further comprising:
   means responsive to the burst signal component of said first and second phase corrected chrominance signals for calculating values corresponding to the magnitudes of the burst signal components of the phase corrected chrominance signals;
   means responsive to the first and second phase corrected chrominance signals, to the values corresponding to the magnitudes of the first and second burst signal components and to a reference value, for providing first and second magnitude and phase corrected chrominance signals, the burst signal component of each having a magnitude substantially equal to said reference value; and
   means for separating each of the two quadrature phase related color difference signal components from each of said first and second magnitude and phase corrected chrominance signals.

4. The apparatus set forth in claim 1 further including sampling means responsive to said time multiplexed composite video signal for providing samples representative thereof at instants determined by said reference clock signal, wherein said filtering means comprises:
   a comb filter coupled to said sampling means for providing comb filtered chrominance samples including part of the low frequency spectrum of the luminance signal component of said first composite video signal component;
   a multiplexer coupled to said sampling means and to said comb filter for providing, during alternate first and second time intervals, said comb filtered chrominance samples and samples representing said second composite video signal component respectively;
   band-pass filtering means coupled to said multiplexer for attenuating the luminance signal components relative to the chrominance signal components of the samples provided by said multiplexer to provide alternating first and second sequences of samples representing the chrominance components of said first and second composite video signals respectively.

5. The apparatus set forth in claim 1 further including sampling means responsive to said time-division multiplexed composite video signal for providing samples representative thereof at instants determined by said reference clock signal, wherein said filtering means comprises:
   a comb filter coupled to said sampling means for providing luminance samples representing the luminance signal component of said first composite video signal component; and
   a low-pass filter coupled to said sampling means for providing samples representing the luminance signal component of said second composite video signal component.

6. In a video signal processing system including a source of time-division multiplexed video signal providing mutually independent main and auxiliary composite video signals respectively during alternate first and second time intervals, each of said composite video signals having luminance signal components and chrominance signal components including two quadrature phase related color difference signal components and a burst signal component, apparatus comprising:
   an oscillator for generating a reference clock signal having a frequency substantially equal to an integral multiple of the frequency of said color burst signal component of said main composite video signal;
   sampling means coupled to said source and to said oscillator for providing samples representing said time-division multiplexed video signal at instants determined by said reference clock signal;
   filtering means coupled to said sampling means for providing, during said first time intervals, first sequences of luminance and chrominance samples representing, respectively the luminance and chrominance signal components of said main composite video signal, and for providing, during said second time intervals, second sequences of luminance and chrominance samples representing, respectively the luminance and chrominance signal components of said auxiliary composite video signal;
   separating means, coupled to said filtering means and responsive to said first and second sequences of chrominance samples for providing, during said first time intervals, two sequences of samples each corresponding to a respectively different one of the two color difference signal components of said main composite video signal and equences of samples each corresponding to a respectively different one of the two color difference signal components of said auxiliary composite video signal.

7. The apparatus set forth in claim 6 further comprising:
   an auxiliary memory, coupled to said separating means for storing the luminance and color difference signal samples provided by said separating means during one of said second time intervals, and for providing said stored samples during a subsequent one of said first time intervals.

8. The apparatus set forth in claim 7 further comprising:
   a main memory, coupled to said separating means for storing luminance and color difference samples provided by said separating means during one of said first time intervals and for providing said stored samples during a subsequent one of said second time intervals.

9. The apparatus set forth in claim 6 wherein said oscillator includes a phase locked loop coupled to said source for providing a reference clock signal having a predetermined phase relationship with respect to the color burst signal component of said main composite video signal.

10. The apparatus set forth in claim 6 wherein said filtering means includes a comb filter responsive to the samples provided by said sampling means during said first time intervals for separating the luminance and chrominance components therefrom, providing, during said first intervals, comb filtered luminance samples of said main composite video signal and comb filtered chrominance samples including part of the low frequency spectrum of the luminance signal components of said main composite video signal.

11. The apparatus set forth in claim 10 wherein the comb filter comprises:
   memory means having an input port coupled to said sampling means, a number of sample delaying stages, and an output port for providing delayed samples of said main composite video signal during said first time intervals;
   first sample weighting means, coupled to said sampling means for multiplying the samples provided thereby during said first time intervals by a selected one of a first set of predetermined weighting factors;
   second sample weighting means, coupled to the output port of said memory means for multiplying the samples provided thereby by a selected one of a second set of predetermined weighting factors;
   third sample weighting means, coupled to said sampling means for multiplying the samples provided thereby during said first time intervals by a selected one of a third set of predetermined weighting factors;
   fourth sample weighting means, coupled to the output port of said memory means for multiplying the samples provided thereby by a selected one of a fourth set of predetermined weighting factors;
   first sample combining means coupled to said first and second sample weighting means for combining the samples provided thereby to produce said comb filtered luminance samples of said main composite video signal;
   second sample combining means coupled to said third and fourth sample weighting means for combining the samples provided thereby to produce said comb filtered chrominance samples of said main composite video signal.

12. The apparatus set forth in claim 10 wherein said filtering means comprises:
   a multiplexer coupled to said sampling means and to said comb filter for providing, during alternate first and second time intervals, said comb filtered chrominance samples and samples representing said second composite video signal component respectively;
   a low-pass filter coupled to said multiplexer for providing, during said first time intervals, samples representing said low frequency spectrum of the luminance signal components to the substantial exclusion of the chrominance signal components of said comb filtered chrominance samples, and during said second time intervals, samples representing the luminance components of said second composite video signal component; and
   means coupled to said low-pass filter and to said comb filter for adding the comb filtered luminance samples and the luminance samples provided by said low-pass filter during said first time interval to provide samples representing full band luminance signal components of said main composite video signal.

13. In a video signal processing system including a source of time division multiplexed video signal having alternating first and second mutually independent composite video signal components each having luminance signal components and chrominance signal components including two quadrature phase related color difference signal components and a color burst signal component, apparatus comprising:
   an oscillator generating a reference clock signal having a frequency substantially equal to an integral multiple of frequency of the color burst signal component of said first composite video signal component;
   an analog to digital converter coupled to said source for generating digital samples representing the time division multiplexed video signals at instants determined by said reference clock signal;
   a comb filter coupled to said analog to digital converter for separating the luminance and chrominance components from the digital samples corresponding to said first composite video signal component, providing comb filtered luminance samples of said first composite video signal and comb filtered chrominance samples including part of the low frequency spectrum of the luminance signal components of said first composite video signal component;
   a multiplex coupled to said analog to digital converter and to said comb filter for providing, during alternate first and second time intervals, said comb filtered chrominance samples and samples representing said second composite video signal component respectively;
   a low-pass filter coupled to said multiplexer for providing, during said first time intervals, samples representing the low frequency spectrum of the luminance signal components to the substantial exclusion of the chrominance signal components of said comb filtered chrominance samples, and during said second time intervals, samples representing the luminance components of said second composite video signal component;
   subtracting means coupled to said multiplexer and to said low-pass filter for subtracting the low frequency luminance samples provided by said low-pass filter during said first time intervals from the comb filtered chrominance samples provided by said multiplexer to provide a first set of difference samples and for subtracting the luminance samples provided by said low-pass filter during said second time intervals from the samples provided by said multiplexer representing said second composite video signal component to provide a second set of difference samples;
   a band-pass filter coupled to said subtracting means for attenuating the luminance signal components relative to the chrominance signal components of said first and second sets of difference samples to provide, during said first time intervals, samples representing the chrominance signal components of said first composite video signal components and, during said second time intervals, samples representing the chrominance signal components of said second composite video signal components;
   burst signal processing means coupled to said band-pass filter for generating, during said first time intervals, first correction factors related to the difference between the phase of the burst signal component of said first composite video signal component at the sampling instants and predetermined phases of said reference clock signal and for generating, during said second time intervals, second correction factors related to the difference between the phase of the burst signal component of said second composite video signal component at the sampling instants and predetermined phases of said reference clock signal;

sample correcting means coupled to said band-pass filter and to said burst signal processing means for combining the samples provided by said band-pass filter during said first time interval with said first correction factors for generating chrominance samples corresponding to said first composite video signal component and having a predetermined phase relationship with said reference clock signal and for combining the samples provided by said band-pass filter during said second time interval with said second correction factors for generating chrominance samples corresponding to said second composite video signal and having a phase relationship with said reference clock signal substantially equal to said predetermined phase relationship and separating means coupled to said sample correcting means for providing, during said first time interval, first and second sequences of samples each corresponding to a respectively different one of the two color difference signal components of said first composite video signal component, and for providing, during said second time interval, first and second sequences of samples each corresponding to a respectively different one of the two color difference signal components of said second composite video signal component.

14. The apparatus set forth in claim 13 further comprising:

an auxiliary memory, coupled to said separating means and to said low-pass filter for storing color difference and luminance signal samples provided respectively by said separating means and by said low-pass filter during one of said second time intervals, and for providing said stored samples during a subsequent one of said first time intervals.

15. The apparatus set forth in claim 14 further comprising:

a main memory, coupled to said separating means and to said comb filter for storing the color difference signal and luminance signal samples provided by said separating means and said comb filter respectively during one of said first time intervals and for providing said stored samples during a subsequent one of said second time intervals.

* * * * *

UNITED STATES PATENT AND TRADEMARK OFFICE
CERTIFICATE OF CORRECTION

PATENT NO. : 4,623,915

DATED : Nov. 18, 1986

INVENTOR(S) : Thomas V. Bolger

It is certified that error appears in the above-identified patent and that said Letters Patent is hereby corrected as shown below:

Column 22, line 35 should read as follows: "main composite video signal and for providing, during said second time interval, two sequences of sam-".

Column 24, line 22 "multiplex" should be --multiplexer--.

Signed and Sealed this

Twenty-eighth Day of April, 1987

Attest:

DONALD J. QUIGG

*Attesting Officer*　　　*Commissioner of Patents and Trademarks*